(12) United States Patent
Jones et al.

(10) Patent No.: US 9,076,435 B2
(45) Date of Patent: *Jul. 7, 2015

(54) APPARATUS FOR TEXT-TO-SPEECH DELIVERY AND METHOD THEREFOR

(71) Applicant: TomTom International B.V., Amsterdam (NL)

(72) Inventors: Rory Jones, Amsterdam (NL); Sven-Erik Jurgens, Paris (CA)

(73) Assignee: TomTom International B.V., Amsterdam (NL)

( * ) Notice: Subject to any disclaimer, the term of this patent is extended or adjusted under 35 U.S.C. 154(b) by 241 days.

This patent is subject to a terminal disclaimer.

(21) Appl. No.: 13/739,117

(22) Filed: Jan. 11, 2013

(65) Prior Publication Data

US 2013/0218567 A1 Aug. 22, 2013

Related U.S. Application Data

(63) Continuation of application No. 12/450,225, filed on Nov. 25, 2009, now Pat. No. 8,386,166.

(51) Int. Cl.
  *G10L 13/02* (2013.01)
  *G01C 21/36* (2006.01)

(52) U.S. Cl.
  CPC ............ *G10L 13/02* (2013.01); *G01C 21/3629* (2013.01)

(58) Field of Classification Search
  CPC ........................................ G10L 13/02
  USPC ................................ 704/270, 260
  See application file for complete search history.

(56) References Cited

U.S. PATENT DOCUMENTS

| | | |
|---|---|---|
| 4,771,390 A | 9/1988 | Dolph et al. |
| 6,298,305 B1 | 10/2001 | Kadaba et al. |
| 6,304,817 B1 | 10/2001 | Troedel |
| 6,345,250 B1 | 2/2002 | Martin |
| 6,385,542 B1 | 5/2002 | Millington |
| 6,542,812 B1 | 4/2003 | Obradovich et al. |
| 6,691,026 B2 | 2/2004 | Odinak et al. |
| 7,490,039 B1 | 2/2009 | Shaffer et al. |
| 7,894,982 B2 * | 2/2011 | Reeser et al. ................. 701/420 |

(Continued)

FOREIGN PATENT DOCUMENTS

| | | |
|---|---|---|
| CN | 1461940 A | 12/2003 |
| DE | 10261824 A1 | 7/2004 |

(Continued)

OTHER PUBLICATIONS

International search Report issued Sep. 18, 2007 for International Application No. PCT/EP2007/002541.

*Primary Examiner* — Susan McFadden

(57) ABSTRACT

A method and apparatus for determining the manner in which a processor-enabled device should produce sounds from data is described. The device ideally synthesizes sounds digitally, and reproduces pre-recorded sounds, together with an audible delivery thereof, a memory in which is stored a database of a plurality data at least some of which is in the form of text-based indicators, and one or more pre-recorded sounds. The device is further capable of repeatedly determining one or more physical conditions, e.g. current GPS location, which is compared with one or more reference values provided in memory such that a positive result of the comparison gives rise to an event requiring a sound to be produced by the device.

20 Claims, 2 Drawing Sheets

(56) References Cited

U.S. PATENT DOCUMENTS

| | | | |
|---|---|---|---|
| 8,386,166 B2 * | 2/2013 | Jones et al. | 701/410 |
| 2003/0083806 A1 | 5/2003 | Odinak et al. | |
| 2009/0076821 A1 | 3/2009 | Brenner et al. | |

FOREIGN PATENT DOCUMENTS

| | | |
|---|---|---|
| EP | 1363106 A2 | 11/2003 |
| EP | 0973011 B1 | 3/2008 |
| JP | 10104011 A | 4/1998 |

* cited by examiner

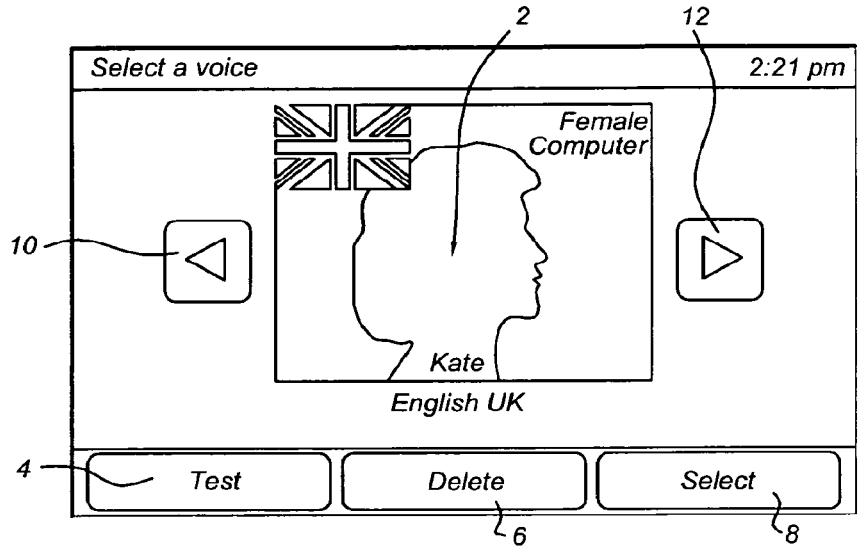

Fig 4

| Speech preferences | 1:11 pm |
|---|---|
| Read aloud street names | ☐ |
| Read aloud road numbers | ☑ |
| Read aloud incoming messages | ☑ |
| Read aloud traffic information | ☑ |
| Read aloud weather information | ☑ |
| Read aloud POI warnings | ☑ |

[ Done ]

Fig 5

| Speech preferences | 1:11 pm |
|---|---|
| Read aloud warnings | ☐ |
| Read aloud tips | ☐ |
| Read aloud tutorials | ☐ |
| disable early warning instructions ('ahead, turn left') | ☐ |
| disable 'keep the moterway lane' instructions | ☑ |
| Read aloud signposts | ☑ |

[ Done ]

Fig 6

Select 8:12 am

- ● Full spoken warning ('Petrol station after 800 meters, next one after 20 miles')
- ○ Brief spoken warning ('Petrol station, 800 meters')
- ○ Sound effect
- ○ Type in your own spoken warning

[ Done ]

APPARATUS FOR TEXT-TO-SPEECH DELIVERY AND METHOD THEREFOR

The present application is a continuation of U.S. patent application Ser. No. 12/450,225, filed on Nov. 25, 2009, which is the National Stage of International Application No. PCT/EP2007/002541, filed Mar. 21, 2007 and designating the United States. The entire contents of these applications are incorporated herein by reference.

This invention is concerned with an apparatus and method for text-to-speech (TTS) delivery.

BACKGROUND

TTS software is well known. Typically, a TTS engine is capable of decoding or interpreting a simple text or word-processor originated document (e.g. ".txt", ".doc" etc.) and converting what is essentially a binary representation of the text into an alternate binary representation in the form of instructions to a sound processor which ultimately delivers the appropriate electric signals to a conventional loudspeaker. The interpretation of the original text document, regardless of whether this is discrete in that it only contains a short phrase or name, or whether it is more expansive and contains one or more paragraphs of text, may typically involve analysis at a granular level, e.g. consonants, vowels and syllables, and may also include grammar and punctuation analysis such that the resulting synthetic speech produced with the correct inflections and intonations and thus sounds as realistic as possible.

In general, there are two methods of synthesizing speech using electronic hardware and software. In concatenative synthesis, synthesized speech is created by concatenating pieces of pre-recorded speech that are stored in a database. Systems differ in the size of the stored speech units; a system that stores only smaller phones or diphones will provide the largest output range, but may lack clarity whereas the storage of entire words or sentences allows for high-quality output. Alternatively in format synthesis, a synthesizer incorporates a model of the vocal tract and other human voice characteristics to create a completely "synthetic" voice output.

Parameters such as fundamental frequency, voicing, and noise levels are varied over time to create a waveform of artificial speech. This method is sometimes called rules-based synthesis; however, many concatenative systems also have rules-based components.

One of the most common usages of speech synthesis since its inception has been to allow blind or partially sighted people to comprehend the written word. More recently, a plethora of modern devices, indeed any device with relatively modest processing power and memory such as Personal Digital Assistants (PDAs), more advanced mobile phones such as so-called smart-phones, games consoles, and in-car satellite navigation systems (SNS) allow some facility for either playing pre-recorded snippets of human voices, or executing TTS software for interpreting any text or word-processed document instantly stored on the device.

This invention has particular application to in-car SNS devices, and although the following description is almost exclusively directed thereto, it will be readily appreciated by the skilled reader that the application of the invention may be of far wider scope, and should not be considered limited by the specific description.

In-car SNS devices have become widespread in the previous 5 or so years, and most devices include both one or more map databases for particular countries, and a capacity for storing a number of pre-recorded phrases, possibly in a variety of different voices, e.g. male, female, and at differing pitches or with different levels of gravitas or jollity. Furthermore, many devices also permit the user to record such phrases in his or her own voice, and there may be a simple routine in the operating software of the device to instruct the user to consecutively record each and every phrase which is required for the correct operation of the device. For instance, the user may be asked to record a variety of different phrases or spoken word snippets such as "Turn Left", "Turn Right", "After 400 meters", etc., and once the recording is complete, the operating software of the device ensures that the users voice snippets are selected for playback at the appropriate time, as opposed to the default or previously selected pre-recorded snippets. Such technology has been available in terms of mobile phones for some time, albeit on a simpler basis, wherein a user may record their own voice and substitute this recording for the default ringtone of the device when a particular person, or indeed any person makes a call to the mobile phone.

The above pre-recorded systems are generally more than adequate for the majority of route navigation operations, but limited in that they do not offer the facility for audible identification of non-standard or country-specific information.

It is therefore an object of this invention to overcome this disadvantage, and provide a more comprehensive audio solution for, among other devices, in-car SNS.

BRIEF SUMMARY OF THE DISCLOSURE

According to the present invention, there is provided a processor-enabled device for producing sounds from data, said device having:
means for processing sounds digitally and means for audible delivery thereof memory in which is stored a database of a plurality data at least some of which is in the form of text-based indicators, and one or more pre-recorded sounds,
data transfer means by which the data is transferred between the processor of the device and said memory, and
operating system software which controls the processing and flow of data betwixt processor and memory, and whether said sounds are audibly reproduced
said device further being capable of repeatedly determining one or more physical conditions which are compared with one or more reference values provided in memory such that a positive result of the comparison gives rise to an event requiring a sound to be produced by the device,
characterised in that
the device further includes a TTS software component which interacts with the operating system or a program executing thereon, said operating system or program making the determination, according to user input, whether the event should be audibly identified by means of
one or more pre-recorded sounds stored on the device,
a sound digitally rendered by the TTS component from a text-based indicator retrieved from the database and appropriate for the event, or
a combination of the above.

In a preferred embodiment, the operating system or program executing thereon is provided with further, more specific user input to permit a selection of the type of events which are to be audibly identified to the user. In particular the operating system of program executing thereon preferably presents a set of options of different types of event which can be selected or de-selected, depending on user preference.

Most preferably, the device is provided with Global Positioning System (GPS) means which include time signal retrieval means, said device thus being capable of determining its physical global location, velocity and acceleration (by performing averaging calculations over time), and the events which are ideally audibly identified to a user are direction instructions as the device (and thus user carrying said device or moving in a vehicle in which said device is installed) moves along a predetermined or pre-programmed route.

Most preferably the data is representative of one or more maps of a thoroughfare network, such as the road network of a particular country or region. Preferably, the data is provided with a variety of different additional data derived from the map(s) which, during the journey, the user may or may not wish to be audibly informed about, such as street names, road numbers, building numbers, Points of Interest (POIs), Signposts. In the case of streetnames, such can only be audibly identified to the user by means of the TTS component.

In a preferred embodiment, the device is further provided with means for determining ambient conditions such as temperature and pressure (information about which may be present in the GPS signal), and additionally the device may be provided with secondary radio-telecommunication means which allow the device to determine traffic conditions along particular sections of a thoroughfare network represented by the data and to receive messages and other information over a pre-existing network, e.g. a mobile telecommunications network or a radio network.

In a desired embodiment, the invention also permits a user to make a selection whether warnings retrieved over such networks are audible, e.g. incoming SMS or other messages such as weather or traffic information.

In a yet further preferred embodiment, the device also permits user selection of whether device-based operational events are audibly identified, for example device operation tips and device tutorial instruction texts.

Most preferably, the device includes user interface means, preferably graphical user interface means, and the operating system or program executing thereon causes the display of one or more option selection pages by means of which the device can be informed whether to digitally render sound by means of the TTS component for one or more different event types requiring audible notification to the user, whether to recall one or more pre-recorded sounds to notify such events, or whether a combination of these operative embodiments is required.

In a second aspect of the invention, there is provided a method of determining the manner in which a processor-enabled device should producing sounds from data, said device having:
means for synthesizing sounds digitally, and re-producing pre-recorded sounds, together with means for audible delivery thereof
memory in which is stored a database of a plurality data at least some of which is in the form of text-based indicators, and one or more pre-recorded sounds,
data transfer means by which the data is transferred between the processor of the device and said memory, and
operating system software which controls the processing and flow of data betwixt processor and memory, and whether said sounds are audibly reproduced
said device further being capable of repeatedly determining one or more physical conditions which are compared with one or more reference values provided in memory such that a positive result of the comparison gives rise to an event requiring a sound to be produced by the device,
characterised in that
the method includes the steps of
offering a selection to the user of the type of sound required to be audibly delivered, and, dependent on the user selection, either
enabling a TTS software component to interact with the operating system or a program executing thereon such that for at least one event, sounds are digitally synthesized from one or more text-based indicators retrieved from the database, or
one or more pre-recorded sounds stored on the device are reproduced for said at least one event, or
a combination of the above.

Preferably, in the case where a user makes a selection that sounds made by device in response to various events should consist exclusively of pre-recorded sounds stored on the device, the method includes the steps of warning a user that certain events will not be audibly identified to said user, for example the identification of street names.

Preferably, in an alternative embodiment in the case where a user makes a selection that one or more events should be audibly notified to the user by means of synthesized sounds, the method includes the further step of providing a plurality of further event options which, depending on selection, the user may wish to have audibly identified. Examples include street names, building numbers, road numbers, incoming radio-telecommunications messages such as traffic, weather, or mobile network messages, POI warnings, device operation tips, device tutorial texts, signpost notifications.

The invention also covers a computer program, whether an operating system or a program intended for execution on a pre-existing operating system, for providing the above functionality to a processor-enabled device.

A specific embodiment of the invention will now be described by way of example with reference to the accompanying drawings wherein:

BRIEF DESCRIPTION OF THE DRAWINGS

FIGS. 1-6 show sample screen shots from an In-car SNS adapted according to the present invention.

DETAILED DESCRIPTION

In-car SNS devices will generally include a touch-screen graphical user interface (GUI), which, in normal operation, will display a route currently being navigated by the user. During configuration of such devices however, the user will be presented with a number of different option screens, some of which are shown in FIG. 1-6.

In FIG. 1 there is shown a "Select a Voice" screen in which various graphics and text, generally indicated at 2 indicate to the user that it is possible to select a pre-recorded voice (identified as "Kate") for the audible notification of events. The screen also displays graphical "buttons" 4, 6, 8, 10, 12 which, when the user touches the screen in the region of these buttons, allow the user to test the voice, delete the voice (along with the previously stored pre-recorded sounds), to select the shown voice, or to scroll back and forth through other pre-recorded voice profiles.

Once the user chooses a particular pre-recorded human voice, a screen such as shown in FIG. 2 is displayed warning the user that street names retrieved from the map database and telecommunications messages received by the device cannot be read out aloud by the device. Of course, it would impractical, not to mention impossible to prerecord a human voice verbalising each and every street name in a particular country.

In the alternative, if a user selects a computer-generated voice (which effectively amounts to instructing the device to digitally synthesize speech from text-based indicators extracted from the map database, in the case of street names and the like, or from simple text such as is included in the messages received by the device), then a screen such as that shown in FIG. 3 may be shown by the device.

In this particular instance, additional options screens such as those shown in FIGS. 4 and 5 are presented to the user (entitled "Speech Preferences" screens), and various event options may be selected or de-selected by the user so that the device audibly identifies the particular events selected by the user and not others.

In FIG. 6, a further option screen demonstrates that the user may yet further specify not only the type of event of which the device is to audibly notify him, but also the extent and type of notification which the device is to give. For example, full or abbreviated spoken warnings may be given, a simple sound effect may suffice, or the user may wish to type in some text which the device converts into synthesized speech.

In general operation of the device, route instructions, i.e. those instructions which the device provides to a user to facilitate navigation from one position to a pre-determined destination entered in the device by the user, will be audibly identified according to the user selection of human voice or computer-generated (synthesized) voice. A computer generated voice will read out at least the same sentences as a Human voice. Depending on the settings, street names can be appended to the route instruction and road numbers, signposts and other indicators can be read out to the user.

The following pages provide examples of the particular phrases which may be spoken by the device, and how they may be constructed:

Single instructions: "After 500 meters turn left—Rembrandtplein"; "Turn left—A4"; "Turn left—A4 towards Utrecht for 31 miles"

Combines instructions: "After 500 meters turn left—Rembrandtplein—then turn right—Amstelstraat"; "Take the exit -6-, then take the motorway—A9";

Single instructions: "Turn left—A4"

In the case where it is desired for the device to audibly indicate distances, then if a metric system is preferred (miles instead of KM) and the current voice is an American TTS voice, the following distances will be read out:

[150 feet, 250 feet, one half mile one quarter mile]

Example:

"After one half mile, turn left"

When joining a motorway on which the user will travel for a certain time, the TTS voice will audibly inform the user about how long he will stay on the same road, by reading out the following: "Follow <road> for <distance>", e.g.

"Follow A10 for 3.6 KM"

"Follow A10 for 37 miles"

The conditions for giving this instruction are:

Speech Preferences setting "read aloud road numbers" must be ON.

The last (final) instruction was at least 15 seconds ago.

You are on the road the instruction is about (not on a slip or feeder road).

The distance from this point to the next instructions is twice as long as the distance to the point where the next instruction will be given, or at least 1500 meters to the next warning. These restrictions may be simply applied in software.

The <distance> variable is the distance to the next instruction, unless the next instruction is one of the following: "Go straight on", "keep left", "keep right"

Example:

The user drives onto a road called A2; After 10 KM there is a reminder at a bifurcation ("keep left"), and 20 KM later the planned route necessitates taking the exit;

In this case, the <distance> that will be given when entering the A2, is 30 KM, even though the next instruction ("keep left—A2"), is already given after 10 KM.

Such operation, again implemented in computer program code, is intended to reduce the amount of information delivered to the user. When street names/road numbers/exits/signposts are read out, they can be spoken too often. To reduce the amount of text the TTS voice will read out to you, the following rules have been implemented:

The same <name> will NOT be said again with 30 seconds, where <name>=signpost/road number/exit number/street name For roads that have early warnings, the street names/road numbers/exits/signpost are always spoken in the early warning. They can also be spoken in the following warning as well, but this may be overruled by the 30-second above rule. If so, it is spoken again at the final warning (which may be overruled by the 30-seconds rule as well).

Example:

"Exit ahead 6, towards Vieuten" (early warning

"After 800 yards, take the exit" (not spoken, because 30-seconds rule)

"Take the—exit, 6, towards Vieuten"

Or

"Ahead, keep right, A2, towards Utrecht" (early warning)

"After 800 meters, keep right, A2, towards Utrecht" (more than 30 seconds in between)

"Keep right"

For other type of roads ("Inner city"), it usually desirable to hear the street name at the crossing. In this case the rule is to only speak the warning at the crossing. However, this warning is sometimes not read out at all, if the previous warning took too long. In some embodiments therefore, it is possible to also read out the information if the distance to the final warning is less than or equal to 200 meters. In this case, there is either no instruction at the crossing, or there is one, but without the extra information.

Examples

"After 300 meters, bear right" (no street name spoken)

"Bear right, Mr Visserplein" (street name spoken AT the crossing)

"After 100 meters, turn left, Amstelstraat" (speak street name, in case there is no instructions AT the crossing)

"After 100 meters, turn left, Amstelstraat" (no warning is given AT the crossing, because the former warning took too long)

"After 200 meters, turn left, Amstelstraat" (because the warning is <=200 m)

"Turn left" (no street name, 30 seconds rule)

For combined instructions of the type "after <distance> turn left into <streetname> then turn right into <streetname>", the second street name is not spoken, unless the combined instructions are given at the crossing. This is because if a combined instruction is given at a crossing, it is likely that the instruction is not spoken again and one will never hear the street name.

Examples

"After 100 meters, turn left, Amstel, then turn right" (second street not spoken)

"Turn right, Herengracht"

"Turn left, Spiegelgracht, then, turn right, Lijnbaansgracht"

"Turn left, Spiegelgracht, then, turn right, Lijnbaansgracht" (no instruction is given, because we immediately had to turn right).

For POI warnings, the following applies.

When this setting is ON (checkbox is selected) and the currently selected voice is a computer generated voice, a radio dialog appears with the following warning type options:

(*) Full warning ("Petrol station: 800 meters. Next opportunity: 20 kilometers")

( ) Brief warning ("Petrol station, 800 meters")

( ) Sound effect ( ) Type in your own warning

1. Full Warning: When full warning is selected for a certain POI type, the following sentence is read out (at the same moments/distances as the current POI warning sounds are given):

<POI Type> is the POI type for which the user selects the warning.
<Distance Unit> is one of the distance units meters/kilometers/yards/miles
<X> is the distance from current position to the POI
<Y> the distance from current position to the next POI of that type.
Example:
"Petrol station: 800 meters. Next opportunity: 20 kilometers"
2. Brief Warning
When Brief Warning is selected for a certain POI Type, the following sentence is read out (at the same moments/distances as the current POI Warning sounds are given):
<POI type><X><Distance Unit>
Example:
"Restaurant: 100 meters".
3. Sound Effect
When Sound Effect is selected, the user is presented with the classic sound selector and the selected sound will be given at the same moment/distances as the current POI Warning sounds are given.
4. Type in Your Own Warning
When this setting is selected for a certain POI type, the user may type in a text, which will be read out when a POI warning is given.
Flash Messages: When this setting is ON (checkbox is selected), some blinking notices (Flash Messages) will be read out, e.g.:
  No valid GPS signal!
  Unable to set roadblock
  Your GPS position is not on the route, cannot determine which roads to block
  No route planned!
  You have already passed this point
  You cannot avoid your destination
  Route changed!
  Route cleared . . .
  No traffic information available for this region
  Could not connect to service . . .
  "Starting demo"
  There are no destinations left to visit
  Next itinerary location not on current map
  No phone number available for POI
  Your outbox is empty
  Unable to call, there is no dial tone
  Download of <xxx> has been cancelled
  Download of <xxx> was successful
  Other messages are within the scope of this application.
Tutorials: When this setting is ON (checkbox is selected), the text of a tutorial page (Guided Tour) will be read out when it is shown on the screen. When going to the next page or when the entire page has been read, the TTS voice stops reading the current page.
Tips: When this setting is ON (checkbox is selected), the text of the tip will be read out when it is shown on the screen. When the tip is clicked away by the user of when the entire tip has been read out, the computer generated voice stops reading the tip.
SMS: SMS reading may be done at two different levels: i. As soon as the SMS arrives (autoread) and ii. when pressing the button "read aloud" in your inbox/outbox.
1. AutoRead: When this setting is ON (checkbox is selected), and incoming SMS message will be read automatically as soon as it arrives, for example: If the sender is known from the address book, the following sentence will be read out: "Incoming message from Johnny: I'll arrive earlier today!"
If the sender is not known, the following sentence will be read out: "Incoming message from <number>:<message>"
Example:
"Incoming message from 06557 40775: I'll arrive earlier today!"
When the message is clicked away or when the entire message has been read out, the computer generated voice stops reading the message.
2. Read aloud (inbox/outbox): When the user selects the message by mobile phone=>read/write message=>read inbox message, the following sentence will be read out: "Message from <sendername_or_number>: <message>"
3. Special messages: It is possible for messages to be sent between devices which contain an indication of the specific position of the senders device; in such cases the following sentence may be read out:
"This message contains a location".
Weather: When this setting is ON (checkbox is selected), the weather information will be read out when it is shown on the screen.
Full sentence: "Weather report for today:<description>, <X> degrees <C/F>".
Example:
"Weather report for today: Sunny, 19 degrees Celsius"
"Weather report for today: Sunny, 67 degrees Fahrenheit".
For enhanced weather reports, the following sentences may be read out:
"Weather report for today <description>. Minimum temperature <X> degrees Celsius_or_Fahrenheit, Maximum temperature: <Y> degrees Celsius_or_Fahrenheit."
When the page showing the weather is clicked away by the user or when the entire weather text has been read out, the computer generated voice stops reading the weather.
Traffic: Traffic information can be read out at two different levels: As soon as new traffic information is available after an update (AutoRead) and when activating a "Read Aloud Traffic Info" function embodied in the software:
1. AutoRead: When this setting is ON (checkbox is selected) and the checkbox "Beep when route traffic information changes" is selected, traffic information will be read out when new traffic information is available for the current route.
If a setting such as "automatically optimize after every update" is DISABLED, the following information may be read out: "Traffic situation on your route has changed" And if a delay is known: "total delay due to traffic now <delay>", where delay is a time, for example 11 minutes.
When a setting such as "automatically optimize after every update" is ENABLED, the following information is read out: "Traffic situation on your route has changed", then "Recalculating route", then when recalculating is finished, the following will be read out: "Your route has been recalculated. New arrival time is 11.45", if the route was recalculated, and "Your route has been recalculated. It has not been changed." If not.
2. A temporary screen function button may be displayed entitled "Read aloud traffic information": When the "traffic" setting is enabled and said button is depressed, a submenu is displayed. There the button "read aloud traffic" can be selected, which has the effect of downloading the details of the incidents on your route will be and the message: "Retrieving traffic information. One moment please"
Is read out.
Once all details of all the incidents are downloaded, the following may be read out for every incident on the route:

<description>, (on the <road number>), between <A> and <B>;
where
(on the <road number>), might not be available
"Between <A> and <B> could be replaced with "at A" (if just one location is available).
Example:
"Retrieving traffic information, one moment please . . . ."
"Slow traffic, on the A1, between Harwich and Reading. Accident, on the A1 between London and Hemel Hempstead"
The first sentence ("Retrieving traffic information. One moment please") could be cut off if all details are downloaded before the entire sentence has been spoken. When, for example, pressing the button a second time, it will be cut off immediately, because all details will already have been downloaded.
Priorities: The features are prioritized in the following order, meaning a route instruction will be given over a POI warning, etc.
1. Route Instructions
2. POI Warnings
3. Toll Charge
4. Traffic
5. SMS
6. Tips Tutorial/Weather
7. Test Button
8. Flash Messages
Of course any other priority order may be applied.
In the event that the user de-selects a computer generated voice and starts using a "human voice" again, some features may not be affected in that the text for such is simply not spoken
Tips
Flash Messages
Tutorial
Weather
SMS (inbox/outbox)
Other features may return to their default condition of being audibly notified to the user by means of a "beep":
SMS (autoread)
Traffic
POI Warning Selection (BOING in this case)
Finally, the remaining features return to being audibly notified to the user by means of the pre-recorded ".wav" or ".mp3" files:
Route instructions

The invention claimed is:

1. A navigation device capable of providing an audible notification of events, comprising:
   a processor;
   a memory storage, including a database having at least some data being in the form of one or more text-based indicators and in the form of one or more pre-recorded human sounds; and
   an audio output component for providing an audible notification of one or more events as computer generated speech and as a pre-recorded human voice;
   wherein the processor is operable to determine one or more physical conditions, associate one or more events with the one or more physical conditions, and determine whether the audible notification of the one or more events is output by the audio output component as computer generated speech or as a pre-recorded human voice.

2. The navigation device of claim 1, wherein each of the one or more events is associated with an event type.

3. The navigation device of claim 2, wherein the event type is one of: a Route instruction, a Point of Interest (POI), Toll charge, Traffic condition, Short Message Service (SMS), Flash message, Weather, Tutorial, Warning, Tip and Signpost notification.

4. The navigation device of claim 1, wherein the audible notification for each of the one or more events is based on the event type associated with each of the one or more events.

5. The navigation device of claim 2, wherein the event type is associated with a priority, and wherein the processor is further operable to provide the audible notification of the one or more events by order of the priority associated with each of the one or more events.

6. The navigation device of claim 1, wherein the audible notification for the one or more events is based on input received from a displayable set of event types which can be selected or de-selected, depending on user preference.

7. The navigation device of claim 1 further comprising a Global Positioning System (GPS) device for providing direction instructions when the one or more events are associated with a predetermined or pre-programmed route.

8. The navigation device of claim 7, wherein the predetermined or pre-programmed route is based on map data representative of one or more maps of a thoroughfare network.

9. The navigation device of claim 8, wherein the map data further comprises: street names, building numbers, road numbers, points of interest (POI) and signpost information.

10. The navigation device claim 1 further comprising a radio-telecommunication device for determining traffic conditions along particular sections of a thoroughfare network and to receive messages and other information through said radio-telecommunication device.

11. The navigation device of claim 1, wherein the human sounds is associated with a human voice profile, wherein the human voice profile is selected by a user from a plurality of pre-recorded human voice profiles.

12. The navigation device of claim 1, wherein the audio output component provides an audible notification associated with a first set of events when there is a determination that the one or more events is to be output as computer generated speech and provides an audible notification associated with a second set of events when there is a determination that the one or more events is to be output as a pre-recorded human voice.

13. The navigation device of claim 1, wherein the processor is further operable to provide a warning to a user that certain events will not be audibly identified to said user when the user selects audible notifications using the pre-recorded human voice.

14. The navigation device of claim 1 further comprising a text to speech software component for digitally synthesizing one or more text-based indicators retrieved from the database into computer generated speech.

15. A method for providing an audible notification of events related to a route navigated by a user, the method comprising:
   receiving, by a processor, a notification type selection from the user indicating a user preference for an audible notification of events, wherein the notification type selection is one of computer generated speech and a pre-recorded human voice;
   determining, by the processor, one or more physical conditions associated with the navigated route;
   associating, by the processor, one or more events with the one or more physical conditions; and
   providing, by a speaker, an audible notification for the one or more events based on the received notification type selection.

16. The method of claim 15 further comprising associating each of the one or more events with an event type and providing an audible notification for each of the one or more events based on the event type associated with each of the one or more events.

17. The method of claim 16 further comprising associating a priority to the event type and providing an audible notification for the one or more events by order of the associated priority.

18. The method of claim 15, wherein the audible notification of the one or more events is based on input received from a displayable set of event types which can be selected or de-selected, depending on user preference.

19. The method of claim 15 further comprising providing direction instructions associated with the route using a Global Positioning System (GPS) device.

20. A non-transitory computer-readable medium which stores a set of instructions which when executed performs a method for providing an audible notification of events related to a route navigated by a user, the method executed by the set of instructions comprising:
- receiving a notification type selection from the user indicating a user preference for an audible notification of events, wherein the notification type selection is one of computer generated speech and a pre-recorded human voice;
- determining one or more physical conditions associated with the navigated route;
- associating one or more events with the one or more physical conditions; and
- providing an audible notification for the one or more events based on the received notification type selection.

* * * * *

UNITED STATES PATENT AND TRADEMARK OFFICE
CERTIFICATE OF CORRECTION

PATENT NO. : 9,076,435 B2  
APPLICATION NO. : 13/739117  
DATED : July 7, 2015  
INVENTOR(S) : Rory Jones et al.

Page 1 of 1

It is certified that error appears in the above-identified patent and that said Letters Patent is hereby corrected as shown below:

ON THE TITLE PAGE

Related U.S. Application Data should read

Continuation of application No. 12/450,225, filed on Nov. 25, 2009 as application No. PCT/EP2007/002541 on Mar. 21, 2007, now Pat. No. 8,386,166.

Signed and Sealed this  
Seventeenth Day of November, 2015

Michelle K. Lee  
*Director of the United States Patent and Trademark Office*